United States Patent [19]

Head et al.

[11] 4,167,742
[45] Sep. 11, 1979

[54] DAMPING MEANS FOR AN INK JET PRINTING DEVICE

[75] Inventors: Donald L. Head, Kettering, Ohio; Robert C. Howard, Arcadia, Calif.

[73] Assignee: The Mead Corporation, Dayton, Ohio

[21] Appl. No.: 901,696

[22] Filed: May 1, 1978

[51] Int. Cl.² .......................................... G01D 15/18
[52] U.S. Cl. ........................................................ 346/75
[58] Field of Search ............................................ 346/75

[56] References Cited

U.S. PATENT DOCUMENTS

| 3,701,998 | 10/1972 | Mathis | 346/75 |
| 3,882,508 | 5/1975 | Stoneburner | 346/75 |

Primary Examiner—Joseph W. Hartary
Attorney, Agent, or Firm—Biebel, French & Nauman

[57] ABSTRACT

An ink jet printing device is provided of the type having a manifold (10) forming a liquid reservoir (11) with means (12) for supplying the reservoir (11) with liquid under pressure, a flexible orifice plate (13) forming one side of the reservoir (11) and containing a plurality of orifices (14) disposed in at least one row through which the printing liquid is expelled, means (18) for stimulating the orifice plate (13) to cause traveling wave vibrations there along so as to induce formation of uniform filaments and droplets from the orifice plate (13), means (15) for electrically charging selective ones of the droplets coming from the orifices (14) and further means (16) for catching the selectively charged droplets. A vibration damping means (21, 26, 32) is provided which engages an end portion or end portions of the orifice plate (13) beyond the end of the rows of orifices (14) for substantially completely damping out the traveling wave vibrations in the orifice plate (13) as they reach the end portions, with the damping means (21, 26, 32) having a V-shaped cross sectioned portions (22, 28, 36) in a plane parallel to the orifice plate (13) with the apex (23) of the V-shaped portion (22, 28, 36) extending towards the oncoming traveling waves. An alternative embodiment uses the damping means (21, 26, 32) in engagement with a pressure plate (40) which is liquid coupled to the orifice plate (13).

10 Claims, 12 Drawing Figures

DAMPING MEANS FOR AN INK JET PRINTING DEVICE

BACKGROUND OF THE INVENTION

1. Field of the Invention

The present invention relates to ink jet printing devices, and more particularly, to such devices which utilize a plurality of orifices extending in at least one row along a printing liquid supply reservoir; the orifice plate, or a remote parallel pressure plate, being stimulated to produce traveling vibrational waves along its length so as to induce a series of uniform filaments and droplets coming from the orifices.

2. Prior Art

Ink jet printing devices of the type generally referred to above are disclosed, for example, in Houser U.S. Pat. No. 3,701,476 and Mathis U.S. Pat. No. 3,701,988. In such devices generation of the series of uniform filaments and droplets in each of the orifices in the rows of orifices formed in the orifice plate is accomplished by mechanical stimulation where a stimulating probe contacts the upper surface of the orifice plate and causes a series of bending waves to travel lengthwise along the orifice plate in the direction of extension of the rows of orifices.

Due to the fact such traveling waves tend to be reflected by the end supports, such as the manifold forming the fluid reservoir above the orifice plate which engages the upper surface of the orifice plate so as to define the active area thereof, some means must be utilized for damping or preventing the reflection of such traveling waves along the orifice plate so that they do not interfere with the main wave propagation. One means of accomplishing this has been the use of wedged shaped dampers formed of, for example, a polyurethane material as is disclosed in the above referred to patents.

These dampers are generally formed after partial assembly of the orifice plate to the manifold so that they can be poured into place on the surface of the orifice plate and allowed to set in a manner such that they define wedged shaped members extending from adjacent the ends of the rows of orifices upwards towards the ends of the manifold where they engage the orifice plate to define the active area thereof. It has been discovered, however, through careful observation thereof, that the damping devices are not as efficient as desired since they do permit a substantial amount of reflected vibrational waves to travel backward from the end of the orifice plate and interfere with the main wave propagation which in turn results in a reduction in uniformity of both filament and droplet formation.

It has been observed that although the polyurethane damping devices are formed in situ, the leading edge pointing towards the direction of approach of the traveling wave in the orifice plate does not actually taper to zero thickness due to the natural surface tension of the liquid polyurethane when it is being poured. Thus, a vertical wall of somewhat concave lateral cross section exists at the beginning of the damper. This wall tends to cause immediate reflection of the traveling wave thus producing secondary interferring waves traveling back towards the stimulator from the damper.

In addition, the use of polyurethane bumpers produces somewhat of an impedance mismatch between the material of the bumper and the material from which the orifice plate is made. This results in an increase in velocity of the waves generated in the damper due to the fact that they are compression waves rather than transverse flexural waves as is the case in the orifice plate. This is true even though the damping material has a lower density and Youngs modulus than the orifice plate. However, it is possible that with appropriately shaped dampers, the effect of impedance mismatch of the materials can be minimized.

SUMMARY OF THE INVENTION

The present invention overcomes the above described disadvantages and difficulties associated with the prior art devices and provide a vibration damping means which engages an end portion or portions of the orifice plate beyond the end of the rows of orifices for substantially completely damping out the traveling wave vibrations in the orifice plate as they reach the end portions. The damping means has a V-shaped cross sectioned portion in a plane parallel to the orifice plate with the apex of the V-shaped portion extending towards the oncoming traveling waves of the orifice plate.

The damping means can be made of the same material or a different material than the orifice plate. Some variations of the present invention include rearwardly tapering the front apex of the V-shaped cross sectioned portion of the damper so as to gradually increase the thickness of the material of the damper which the traveling wave sees as it continues along the surface of the orifice plate towards the end thereof. This particular configuration reduces the effect of any mismatch of impedance in differing materials by slowly increasing the thickness of the material adjacent the orifice plate. A further alternative, but similar approach, involves the use of stepped, identically shaped, V-shaped cross sectioned portions extending away from the oncoming traveling wave with the beginning of each step being approximately one quarter of the wave length of the resonant frequency of vibration of the orifice plate so that any mismatch of impedance from step to step is minimized by canceling out the reflected wave motion.

In addition, it is contemplated that such bumpers made in accordance with the present invention can be utlized in ink jet printing devices which utilize a liquid coupled traveling wave stimulation technique such as that disclosed in application Ser. No. 828,274 assigned to the same assignee as the present invention.

Such devices employ a flexible pressure plate which is stimulated in the same manner as the flexible orifice plate in the prior art devices described above, but the pressure plate is disposed above and parallel to a relatively rigid orifice plate with the printing liquid passing between and engaging both the orifice plate and the pressure plate so that traveling waves induced into the pressure plate will be transmitted through the liquid to the orifice plate and ultimately result in the production of a series of uniform filaments and droplets of printing liquid being expelled from the orifices. The damping devices of the present invention can easily be employed with such liquid coupled devices by merely inverting the dampers and securing them to the pressure plate rather than the orifice plate.

DETAILED DESCRIPTION OF THE PREFERRED EMBODIMENT

Figure 1:
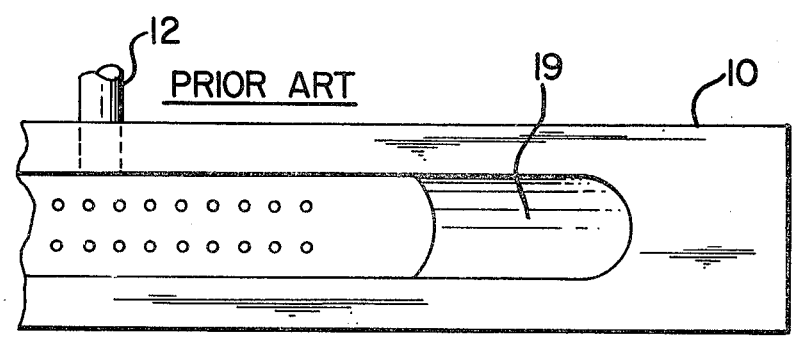
FIGS. 1 and 2 are respectively a top plan view and side cross sectional view illustrating the polyurethane bumpers of the prior art placed in position in the manifold on the upper surface of the orifice plate.
Figure 2:
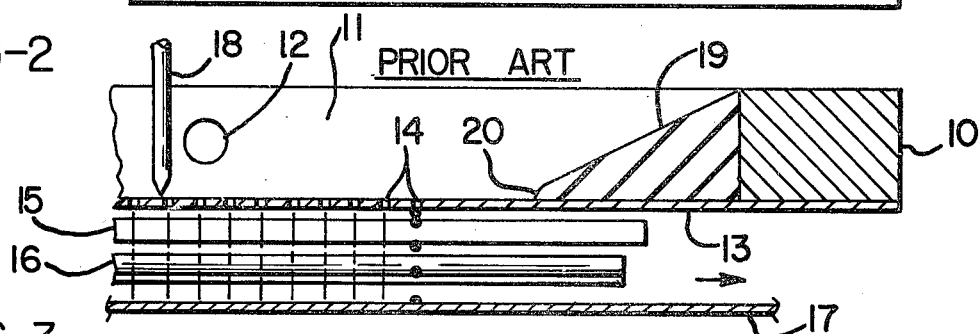

The details of the general construction of an ink jet printing device of the type in which the dampers of the present invention can be utilized are fairly well known in the prior art and will therefore not be discussed in detail herein. However, details of such a construction can be obtained for example by reference to the Houser U.S. Pat. No. 3,701,476. Basically, as shown in FIGS. 1 and 2 such devices include a manifold 10 (the top cover plate being removed for illustration) providing a liquid containing reservoir 11 which is supplied with printing liquid through a supply line 12. Secured to the bottom of the manifold 10 is an orifice plate 13 provided with a plurality of orifices 14 through which the printing liquid is expelled. Disposed immediately beneath the bottom of the orifice plate 13 is an electrical charging plate 15 such as that disclosed in the above referred to patent. Beneath the charging plate 15 is a catcher 16 which captures appropriately charged droplets and prevents them from impacting the recording medium 17 so that the actual recording takes place with the uncharged droplets impacting the recording medium 17 at the desired locations.

In order to induce a phased relationship in the production of uniform series of filaments and droplets extending from the rows of orifices 14, a mechanical stimulation device 18 can be utilized which impacts the upper surface of orifice plate 13 and induces traveling wave vibrations along the surface of orifice plate 13. Such a device is also disclosed in the above referred to patent. The stimulator 18 can be positioned at any one of several locations along the surface of the orifice plate depending upon the particular configuration thereof. Because of this, it is possible that in some printing heads only a single damper need be utilized while in others it may be necessary to use the damper at each end in order to prevent reflection of the main wave traveling through the orifice plate.

As mentioned above, the prior art damping devices which the present invention are intended to replace, basically comprise a damper 19 of polyurethane rubber or other similar material which has been poured into the partially assembled manifold 10 which supports the orifice plate 13. The damper 19 is positioned on the orifice plate beyond the ends of the rows of orifices 14 remote from stimulator 18. This is generally accomplished in the manner described in the above referred to Houser U.S. Pat. No. 3,701,476, by simply tilting the manifold and attached orifice plate at an appropriate angle from the vertical, pouring the liquid polyurethane into the end portion of the tilted manifold on top of the orifice plate and allowing the polyurethane to harden in position and then repeating the same operation with the manifold tilted in the opposite direction from the vertical for the opposite end of the orifice plate and manifold.

As is shown slightly exagerated in FIG. 2, the leading edge portion 20 of the polyurethane damping device 19 tends to form a vertical or rounded wall which engages the upper surface of the orifice plate 13 in a plane substantially perpendicular thereto.

It is also to be noted that the leading edge is somewhat concave in configuration as shown in FIG. 1 which is probably due to a capillary type effect between the liquid polyurethane material and the side walls of the manifold when it is poured into place. This configuration tends to present a wall of vibrationally impedance mismatched material, i.e. the polyurethane, from that of the orifice plate. The wall further presents a finite thickness of material which tends to inhibit vibration of the polyurethane damper 19 in phase with the orifice plate so that a reduced amount of energy enters the damper 19 than would occur if the leading edge 20 of the damper 19 began at a close to zero thickness and then gradually increased so as to slowly absorb more and more of the energy in the traveling wave of the orifice plate.

Figure 3:
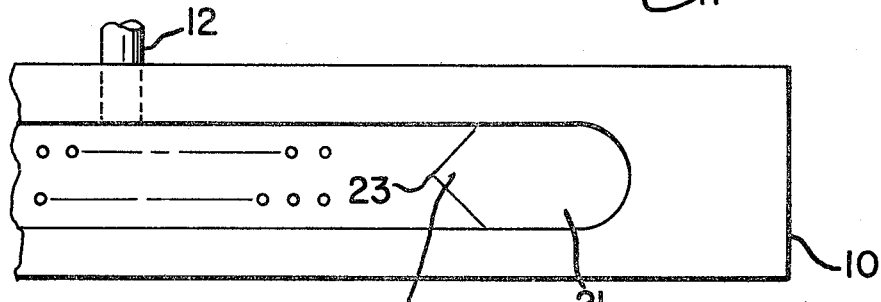
FIGS. 3 and 4 are respectively a top plan view and side cross sectional view of a first preferred embodiment of damping means positioned in a manifold on the surface of the orifice plate.
Figure 4:
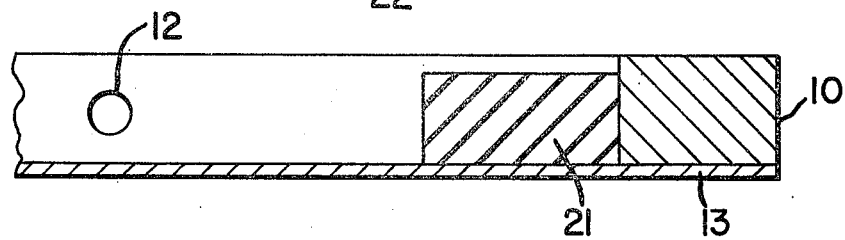

Reffering now to the embodiment shown in FIGS. 3 and 4 the manifold 10 and orifice plate 13 constructions are the same as with the prior art, however, in this embodiment the damping means 21 is formed with a V-shaped cross sectioned portion 22, the V-shaped cross section being in a plane parallel to the orifice plate 13 as shown in FIG. 3. The leading edge or apex 23 of damping member 21 extends perpendicular to the orifice plate. The V portion 22 extends rearwardly from the apex 23 in the direction of travel of the vibrational waves in the orifice plate, i.e. extending towards the end portion of the plate away from the position of the stimulating device.

In this embodiment the vibration damping member 21 may be formed of any material, even the same material as the orifice plate 13 and could, if desired, be formed of the same piece as the orifice plate 13 so as to be integral therewith. It is preferable that the thickness of the damping member be at least ¾ the thickness of the orifice plate in order to provide sufficient mass to absorb the energy and dampen the vibrational waves in the orifice plate. The damper 21 may, of course, also be fabricated from the polyurethane rubber material or the like since, unlike the prior art embodiment disclosed in FIGS. 1 and 2, the apex or leading edge 23 of the damping member 21 presents a point along the center line of the active area of the orifice plate 13 so that the traveling wave initially sees a very slight amount of material engaging the upper surface of the orifice plate, which material is constantly increasing as the wave travels toward the end of manifold 12. This should effectively reduce the effect of mismatch in the material by gradually introducing the material along the surface of the orifice plate 13.

Figure 5:
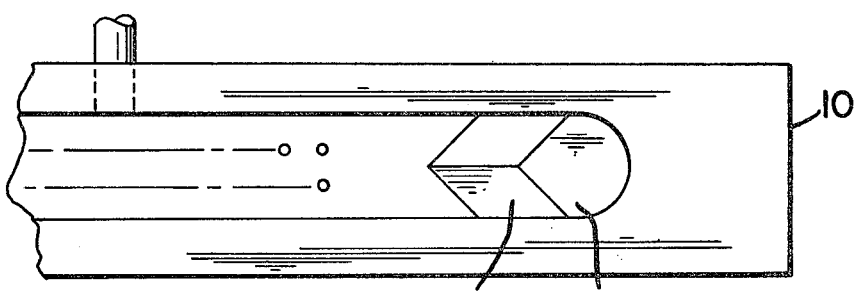
FIGS. 5 and 6 are respectively a top plan view and a side cross sectional view of a second alternative embodiment of the damping means of the present invention in the manifold on the surface of an orifice plate.
Figure 6:
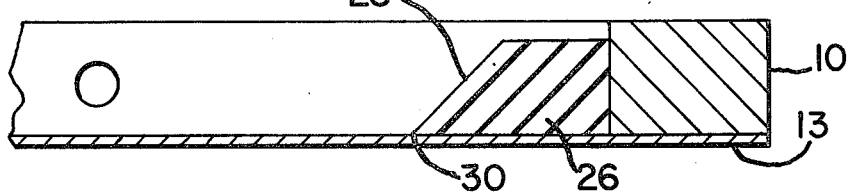

In the alternative embodiment as illustrated in FIGS. 5 and 6 the damping device 26 is again provided with a V-shaped cross sectioned portion 28 extending upward from the surface of the orifice plate 13, but in this case it is slanted rearwardly in a vertical plane along the center line of the orifice plate 13 and rearwardly from the tip 30 which engages the surface of the orifice plate 13. This configuration further reduces the initial material which the traveling waves in the orifice plate face as they engage the damping member 26. This further slopping and reduction of material in the V-shaped portion 28 is intended to further reduce the effects of mismatch in impedance between the material of the damping member 26 and orifice plate 13 so that more energy is absorbed in the damping member 26 rather than being repelled thereby. Again, the damping member 26 can be made of any material such as the material from which the orifice plate is made and can also be made integral therewith, or it may be made with a polyurethane rubber or like material.

Figure 7:
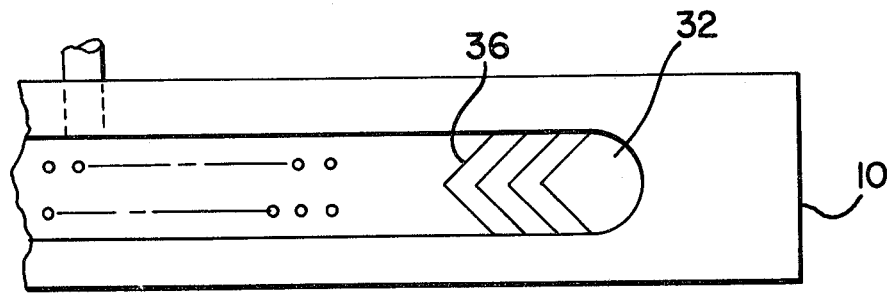
FIGS. 7 and 8 are respectively a top plan view and side cross sectional view of a third preferred embodiment of damping means positioned in a manifold on the surface of an orifice plate.
Figure 8:
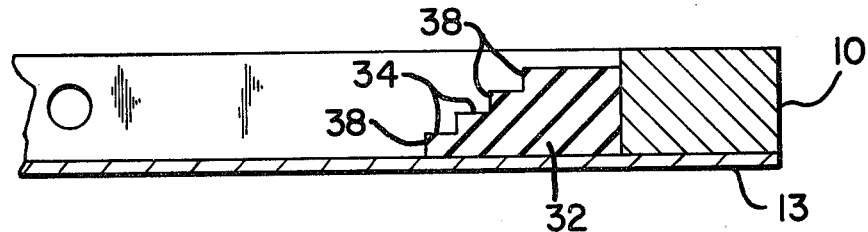

The embodiment illustrated in FIGS. 7 and 8 is yet a further variation on the present invention in that it provides a stepped damping member 32. Each of the stepped portions 34 of damping member 32 have a V-shaped cross sectioned portion such as 36 in a plane parallel to the orifice plate. The distance between adjacent apexes 38 of succeeding steps 34 is preferably one quarter of the wave length of the natural frequency of vibration of the orifice plate 13 so that mismatching of impedance is further reduced by the cancelling effect of reflected waves.

Any number of stepped portions 34 may be utilized in order to present a sufficient build up of material prior to reaching the end portion of the manifold 10 so as to prevent reflected waves and it is contemplated that each stepped portion can be individual pieces extending from their apex 38 to the rear wall of the manifold 10.

Figure 9:
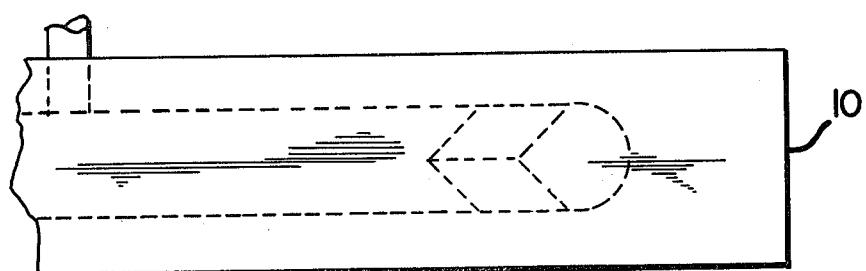
FIGS. 9 and 10 are respectively a top plan view and side cross sectional view of the damper of the second preferred embodiment illustrated in FIGS. 5 and 6, but utilized in position against a pressure plate in a liquid coupled traveling wave stimulation ink jet printing device.
Figure 10:
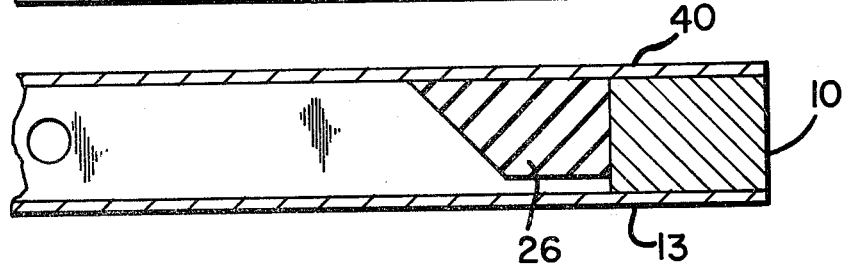

Referring to FIG. 9, the damping member 26 of the embodiment illustrated in FIGS. 5 and 6 is here shown in an alternative position engaging a pressure plate 40 covering the upper surface of the reservoir formed in the manifold 10 and remote from the orifice plate 13. This type of ink jet printing device is generally disclosed in U.S. patent application Ser. No. 828,274 filed Aug. 29, 1977. In this type of device the pressure plate is stimulated in essentially the same manner as the orifice plate in the previously referred to embodiments so that a traveling wave is generated along the surface of the pressure plate 40 which is fluid coupled via the liquid in the reservoir of the manifold 10 to the orifice plate 13 so as to induce the formation of uniform filaments and droplets from the orifice plate 13. Since the orifice plate 13 in this instance is relatively rigid and is not intended to flex or vibrate as in the above embodiments, the damping member 26 is secured to the flexible pressure plate 40 so that no reflected waves will be created when the traveling waves reach the end of the manifold 10. The damping member 26 otherwise functions in the same manner as described above in connection with FIGS. 5 and 6.

Figure 11:
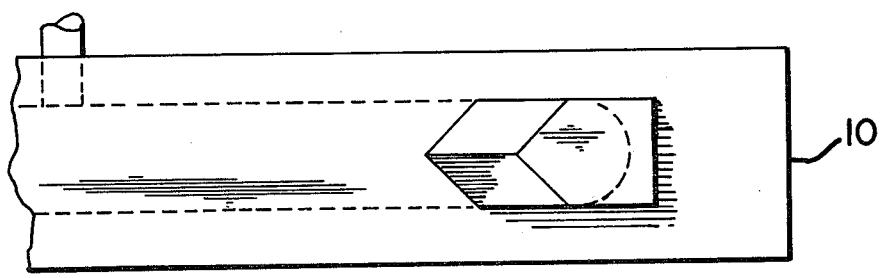
FIGS. 11 and 12 are respectively a top plan view and a side cross sectional view of the damper of the second preferred embodiment illustrated in FIGS. 5, 6, 9 and 10, but which is positioned on the upper surface of the pressure plate outside of the reservoir containing the printing liquid.
Figure 12:
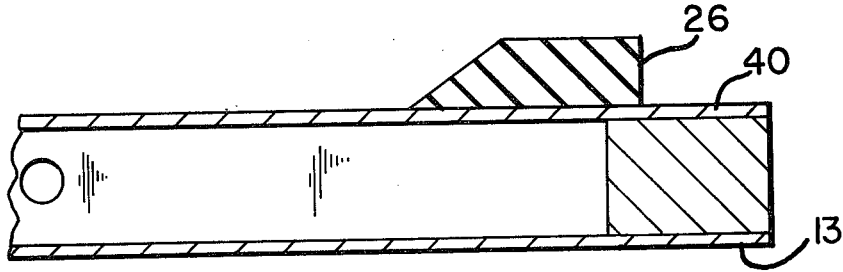

It is further contemplated that in such a device the damping members could be positioned on the surface of the orifice plate 13 or pressure plate 40 outside of the reservoir (as shown for example in FIGS. 11 and 12) and thus out of contact with the printing liquid since the same damping characteristics can be utilized on either side of the plate being vibrated.

Although the foregoing illustrates the preferred embodiments of the present invention, other variations are possible. All such variations as would be obvious to one skilled in this art are intended to be included within the scope of the invention as defined by the following claims.

What is claimed is:

1. In an ink jet printing device of the type having a manifold means forming a liquid reservoir, means supplying said reservoir with liquid under pressure, a flexible elongated orifice plate forming one side of said reservoir and containing a plurality of orifices disposed in at least one row through which said liquid is expelled, means stimulating said orifice plate to cause traveling wave vibrations therealong to induce formation of uniform filaments and droplets from said orifices and means for catching said selectively charged droplets, wherein the improvement comprises:

vibration damping means engaging end portions of said orifice plate beyond said orifices for substantially completely damping out said traveling wave vibration in said orifice plate as it reaches said end portions, said damping means having a V-shaped cross sectioned portion in a plane parallel to said orifice plate, the apex of said V-shaped portion extending towards the oncoming traveling waves in the orifice plate.

2. An ink jet printing device as defined in claim 1 wherein said vibration damping means further includes said damping means being made of the same material as the orifice plate and having a thickness of at least three quarters of the thickness of the orifice plate.

3. An ink jet printing device as defined in claim 1 wherein said vibration damping means further includes a plurality of stepped V-shaped cross section portions of the same configuration and stepped rearwardly away from the direction of travel of the traveling waves in the orifice plate approximately ¼ of the wave length of resonant frequency of vibration of the orifice plate.

4. An ink jet printing device as defined in claim 1 wherein said vibration damping means tapers rearwardly in a vertical plane through the center line of the orifice plate from the apex of the V-shaped cross sectioned portion which engages the orifice plate.

5. An ink jet printing device as defined in claim 1 wherein the vibration damping means is substantially vibrationally impedance matched with the orifice plate.

6. In an ink jet printing device of the type having a manifold means forming a liquid reservoir, means supplying said reservoir with liquid under pressure, an elongated orifice plate forming one side of said reservoir and containing a plurality of orifices disposed in at least one row through which said liquid is expelled, a flexible elongated pressure plate forming another side of said reservoir parallel to said orifice plate and in engagement with liquid in said reservoir, means stimulating said pressure plate to cause traveling wave vibrations therealong to induce formation of uniform filaments and droplets from said orifices and means for catching said selectively charged droplets, wherein the improvement comprises:

vibration damping means engaging end portions of said pressure plate for substantially completely damping out said traveling wave vibration in said pressure plate as it reaches said end portions, said damping means having a V-shaped cross sectioned portion in a plane parallel to said pressure plate, the apex of said V-shaped portion extending towards the oncoming traveling waves in the pressure plate.

7. An ink jet printing device as defined in claim 6 wherein said vibration damping means further includes said damping means being made of the same material as the pressure plate and having a thickness of at least three quarters of the thickness of the pressure plate.

8. An ink jet printing device as defined in claim 6 wherein said vibration damping means further includes a plurality of stepped V-shaped cross section portions of the same configuration and stepped rearwardly away from the direction of travel of the traveling waves in the pressure plate approximately ¼ of the wave length of resonant frequency of vibration of the pressure plate.

9. An ink jet printing device as defined in claim 6 wherein said vibration damping means also tapers rearwardly in a vertical plane through the center line of the pressure plate from the apex of the V-shaped cross sectioned portion which engages the pressure plate.

10. An ink jet printing device as defined in claim 6 wherein the vibration damping means is substantially vibrationally impedance matched with the pressure plate.

* * * * *